United States Patent
Kehimkar et al.

(10) Patent No.: US 11,001,310 B2
(45) Date of Patent: May 11, 2021

(54) HVAC INSTRUMENT PANEL BRACKET

(71) Applicant: GM Global Technology Operations LLC, Detroit, MI (US)

(72) Inventors: Simon A. Kehimkar, Canton, MI (US); Brennon L. White, Novi, MI (US); Marcus J. Baker, Lapeer, MI (US); Paul J. Wolcott, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 16/267,807

(22) Filed: Feb. 5, 2019

(65) Prior Publication Data

US 2020/0247478 A1    Aug. 6, 2020

(51) Int. Cl.
  *B62D 25/14*  (2006.01)
  *B60H 1/00*  (2006.01)
  *B60R 16/02*  (2006.01)
  *B62D 21/15*  (2006.01)

(52) U.S. Cl.
  CPC ......... *B62D 25/142* (2013.01); *B60H 1/0055* (2013.01); *B60R 16/0207* (2013.01); *B62D 21/152* (2013.01)

(58) Field of Classification Search
  CPC .... B62D 25/14; B62D 25/142; B62D 25/145; B62D 21/17; B62D 21/152; B60H 1/055; B60H 1/00564; B60H 1/00295; B60K 37/00; B60R 16/0207
  USPC ................... 296/70, 72, 193.02, 208; 180/90
  See application file for complete search history.

(56) References Cited

U.S. PATENT DOCUMENTS

| | | | | |
|---|---|---|---|---|
| 5,354,114 A | * | 10/1994 | Kelman | B60H 1/0055 296/192 |
| 5,549,344 A | * | 8/1996 | Nishijima | B60H 1/0055 180/90 |
| 6,110,037 A | * | 8/2000 | Yoshinaka | B60H 1/0055 454/143 |
| 6,250,678 B1 | * | 6/2001 | Yoshinaka | B60H 1/0055 280/752 |
| 6,409,590 B1 | * | 6/2002 | Suzuki | B60H 1/0055 454/143 |
| 8,480,166 B1 | * | 7/2013 | Readwin | B60H 1/246 296/208 |
| 2001/0003404 A1 | * | 6/2001 | Shikata | B60K 37/00 307/10.1 |

(Continued)

FOREIGN PATENT DOCUMENTS

| | | |
|---|---|---|
| DE | 10058318 A1 | 5/2001 |
| FR | 1258918 A | 4/1961 |

*Primary Examiner* — Gregory A Blankenship

(57) ABSTRACT

A structural instrument panel member for an instrument panel assembly of a vehicle comprises a cross beam, a steering column support, a first and second HVAC duct, and a first dash panel mount. The cross beam mount has a first surface, a first side, a second side and a first, second, third, fourth and fifth walls. The cross beam mount is fastened to a cross beam of the vehicle. The steering column support extends from the first side of the cross beam mount. The first and second HVAC duct each have a first end and a second end. The first HVAC duct is disposed on the second side of the cross beam mount and the second HVAC duct is disposed adjacent the first HVAC duct. The first dash panel mount extends from the first HVAC duct and fastened to a dash panel of the vehicle.

8 Claims, 2 Drawing Sheets

(56) References Cited

U.S. PATENT DOCUMENTS

| | | | |
|---|---|---|---|
| 2001/0052716 A1* | 12/2001 | Lyonnet | B62D 29/004 296/72 |
| 2002/0038965 A1* | 4/2002 | Palazzolo | B62D 25/145 296/208 |
| 2002/0130529 A1* | 9/2002 | Takano | B60K 37/00 296/70 |
| 2002/0145309 A1* | 10/2002 | Shikata | B62D 25/00 296/208 |
| 2003/0122403 A1* | 7/2003 | Brancheriau | B62D 29/004 296/208 |
| 2003/0155793 A1* | 8/2003 | Yoshihara | B62D 25/142 296/208 |
| 2004/0108744 A1* | 6/2004 | Scheib | B62D 25/142 296/70 |
| 2004/0188885 A1* | 9/2004 | Lorenzo | B60K 37/00 264/328.1 |
| 2004/0262954 A1* | 12/2004 | Scheib | B62D 29/004 296/193.02 |
| 2005/0253409 A1* | 11/2005 | Sato | B62D 25/14 296/70 |
| 2006/0191704 A1* | 8/2006 | Riester | B62D 29/004 174/72 A |
| 2007/0210616 A1* | 9/2007 | Wenzel | B29C 45/006 296/187.03 |
| 2007/0295453 A1* | 12/2007 | Koelman | B62D 25/145 156/331.8 |
| 2008/0067835 A1* | 3/2008 | Ramos | B62D 25/145 296/192 |
| 2012/0032044 A1* | 2/2012 | Ruiz Rincon | B62D 29/001 248/205.3 |
| 2015/0217624 A1* | 8/2015 | Herr-Rathke | B62D 29/005 296/193.02 |
| 2018/0099689 A1* | 4/2018 | Kurita | B62D 1/195 |
| 2019/0185068 A1* | 6/2019 | Mullen | B62D 29/04 |
| 2019/0210464 A1* | 7/2019 | Dormanns | B62D 25/145 |
| 2020/0010122 A1* | 1/2020 | Hashimura | B21C 37/151 |
| 2020/0164924 A1* | 5/2020 | Yamaguchi | B62D 25/145 |
| 2020/0247478 A1* | 8/2020 | Kehimkar | B60H 1/0055 |

* cited by examiner

HVAC INSTRUMENT PANEL BRACKET

INTRODUCTION

The present disclosure relates generally vehicle instrument panels and more particularly to integrated instrument panels.

Vehicle instrument panel assemblies are complicated assemblies that are designed to provide for many of the functions, both visible and hidden, available in today's vehicles. Climate control, occupant safety, structural support, and vehicle operation are just a few of the vehicle functions that are made possible by an instrument panel assembly. For example, instrument panel assemblies include support for a steering column that is essential for an operator to control the vehicle. Also, the climate control system utilizes the instrument panel assembly to route hot or cold air to the occupant compartment of the vehicle. As with many assemblies achieving a wide variety of functionality, the instrument panel assembly has become difficult to manufacture and install in a vehicle. Furthermore, as instrument panel assemblies have taken on more function they have also taken on more packaging space and weight in the vehicle, become more costly to produce, and maybe become less functional in some areas over improved functionality in others.

Accordingly, there is a need in the art for improved instrument panel assembly having improved functionality and manufacturing capability, be less costly, and provide superior fit while reducing manufacturing complexity.

SUMMARY

The present disclosure includes an example of a structural instrument panel member for an instrument panel assembly of a vehicle. The structural instrument panel member comprises a cross beam mount, a steering column support, and a first HVAC duct. The cross beam mount has a first surface, a first side, and a second side. The cross beam mount is fastened to a cross beam of the vehicle. The steering column support extends from the first side of the cross beam mount. The first HVAC duct having a first end and a second end. The first HVAC duct is disposed on the second side of the cross beam mount.

In one example of the present disclosure, the structural instrument panel member further comprises a first dash panel mount extended from the first HVAC duct and fastened to a dash panel of the vehicle.

In another example of the present disclosure, the structural instrument panel member further comprises a second HVAC duct having a third end and a fourth end. The second HVAC duct is disposed adjacent the first HVAC duct.

In yet another example of the present disclosure, the structural instrument panel member further comprises a first, second, third, fourth and fifth walls. The first wall is adjacent each of the first and second HVAC ducts. The second wall is adjacent the first HVAC duct and the second side of the cross beam mount. The third wall forms a top of each of the first and second HVAC ducts. The fourth wall forms a bottom of each of the first and second HVAC ducts. The fifth wall is opposite the second wall.

In yet another example of the present disclosure, at least one of the first, second, third, fourth and fifth walls include an internal cavity.

In yet another example of the present disclosure, the structural instrument panel member further comprises a sound absorbing member disposed in the internal cavity of the at least one of the first, second, third, fourth and fifth walls.

In yet another example of the present disclosure, the structural instrument panel member further comprises an energy absorbing member disposed in the internal cavity of the at least one of the first, second, third, fourth and fifth walls.

In yet another example of the present disclosure, the structural instrument panel member further comprises a channel disposed in at least one of the first, second, third, fourth and fifth walls.

In yet another example of the present disclosure, the structural instrument panel member further comprises a wire harness disposed in the channel of the at least one of the first, second, third, fourth and fifth walls.

The present disclosure includes another example of a structural instrument panel member for an instrument panel assembly of a vehicle. The structural instrument panel member comprises a cross beam, a steering column support, a first and second HVAC duct, and a first dash panel mount. The cross beam mount has a first surface, a first side, and a second side. The cross beam mount is fastened to a cross beam of the vehicle. The steering column support extends from the first side of the cross beam mount. The first and second HVAC duct each have a first end and a second end. The first HVAC duct is disposed on the second side of the cross beam mount and the second HVAC duct is disposed adjacent the first HVAC duct. The first dash panel mount extends from the first HVAC duct and fastened to a dash panel of the vehicle.

In one example of the present disclosure, the structural instrument panel member further comprises a first, second, third, fourth and fifth walls. The first wall is adjacent each of the first and second HVAC ducts. The second wall is adjacent the first HVAC duct and the second side of the cross beam mount. The third wall forms a top of each of the first and second HVAC ducts. The fourth wall forms a bottom of each of the first and second HVAC ducts. The fifth wall is opposite the second wall.

In another example of the present disclosure, at least one of the first, second, third, fourth and fifth walls includes an internal cavity.

In yet another example of the present disclosure, the structural instrument panel member further comprises a sound absorbing member disposed in the internal cavity of the at least one of the first, second, third, fourth and fifth walls.

In yet another example of the present disclosure, the structural instrument panel member further comprises an energy absorbing member disposed in the internal cavity of the at least one of the first, second, third, fourth and fifth walls.

In yet another example of the present disclosure, the structural instrument panel member further comprises a channel disposed in at least one of the first, second, third, fourth and fifth walls.

The present disclosure includes yet another example of a structural instrument panel member for an instrument panel assembly of a vehicle. The structural instrument panel member comprises a cross beam, a steering column support, a first and second HVAC duct, and a first dash panel mount. The cross beam mount has a first surface, a first side, a second side and a first, second, third, fourth and fifth walls. The cross beam mount is fastened to a cross beam of the vehicle. The steering column support extends from the first side of the cross beam mount. The first and second HVAC duct each have a first end and a second end. The first HVAC duct is disposed on the second side of the cross beam mount and the second HVAC duct is disposed adjacent the first HVAC duct. The first dash panel mount extends from the first HVAC duct and fastened to a dash panel of the vehicle. The first wall is adjacent each of the first and second HVAC ducts. The second wall is adjacent the first HVAC duct and the second side of the cross beam mount. The third wall forms a top of each of the first and second HVAC ducts. The fourth wall forms a bottom of each of the first and second HVAC ducts. The fifth wall is opposite the second wall.

In one example of the present disclosure, at least one of the first, second, third, fourth and fifth walls include an internal cavity.

In another example of the present disclosure, the structural instrument panel member further comprises a sound absorbing member disposed in the internal cavity of the at least one of the first, second, third, fourth and fifth walls.

In yet another example of the present disclosure, the structural instrument panel member further comprises an energy absorbing member disposed in the internal cavity of the at least one of the first, second, third, fourth and fifth walls.

In yet another example of the present disclosure, the structural instrument panel member further comprises a channel and a wire harness. The channel is disposed in at least one of the first, second, third, fourth and fifth walls and the wire harness is disposed in the channel.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
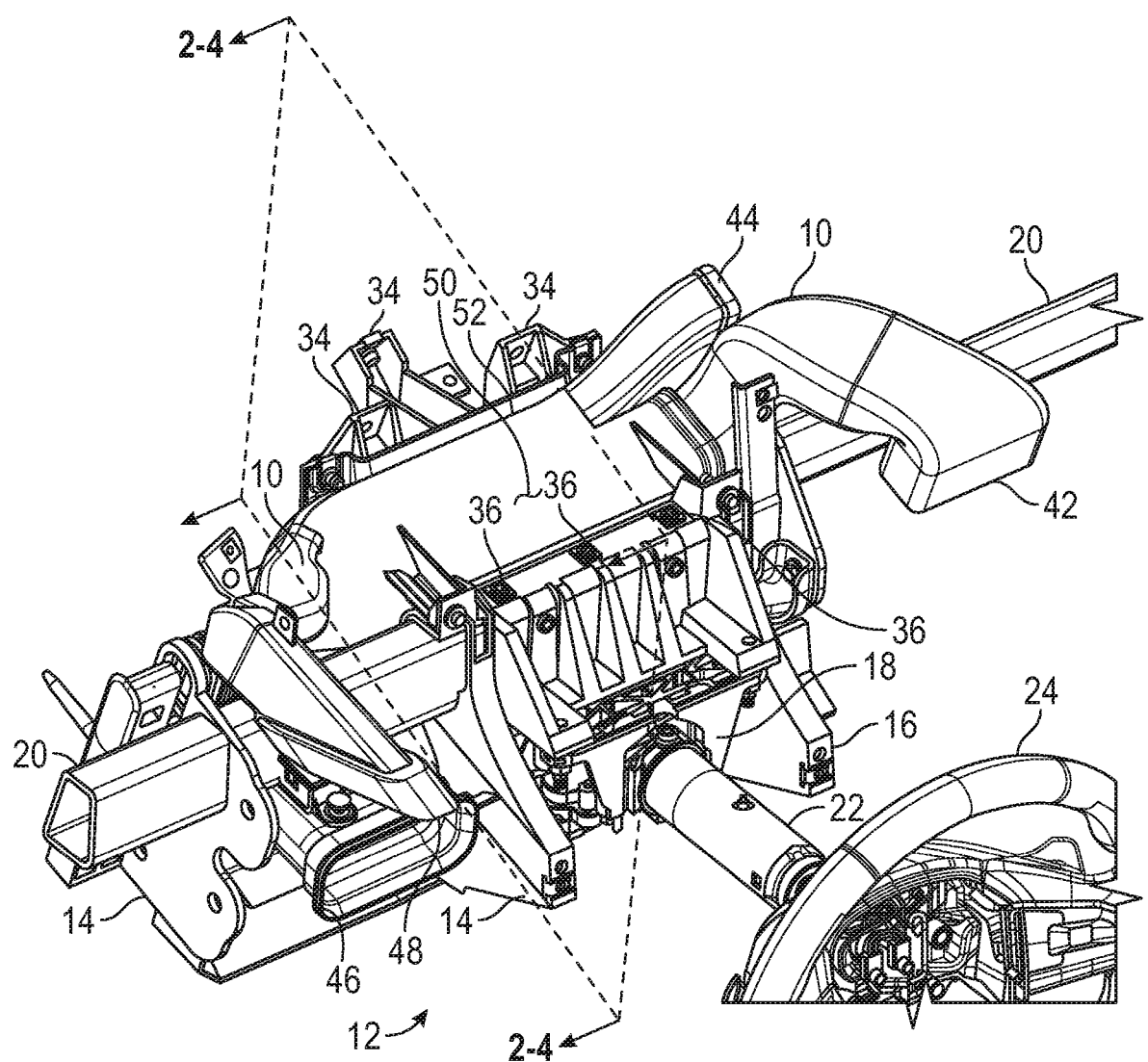
FIG. 1 is a perspective view of an instrument panel assembly according to the principles of the present disclosure.

Examples of the present disclosure advantageously provide a structural heating, ventilation, and air conditioning (HVAC) member for an instrument panel assembly (IP) of a vehicle. Referring to the drawings, wherein like reference numbers refer to like components, FIG. 1 illustrates the structural IP member, designated with the reference number 10, in the IP assembly 12 environment. In addition to the structural IP member 10, the IP assembly 12 includes a first bracket 14, a second bracket 16, and a steering column bracket 18. The IP assembly 12 is supported predominately by a cross beam 20 and supports the steering column assembly 22 and steering wheel 24. The first and second brackets 14, 16 are also supported by the cross beam 20 and in turn support additional components such as the instrument panel (not shown). The cross beam 20 extends the width of the vehicle and is supported by the frame (not shown) of the vehicle.

Figure 2:
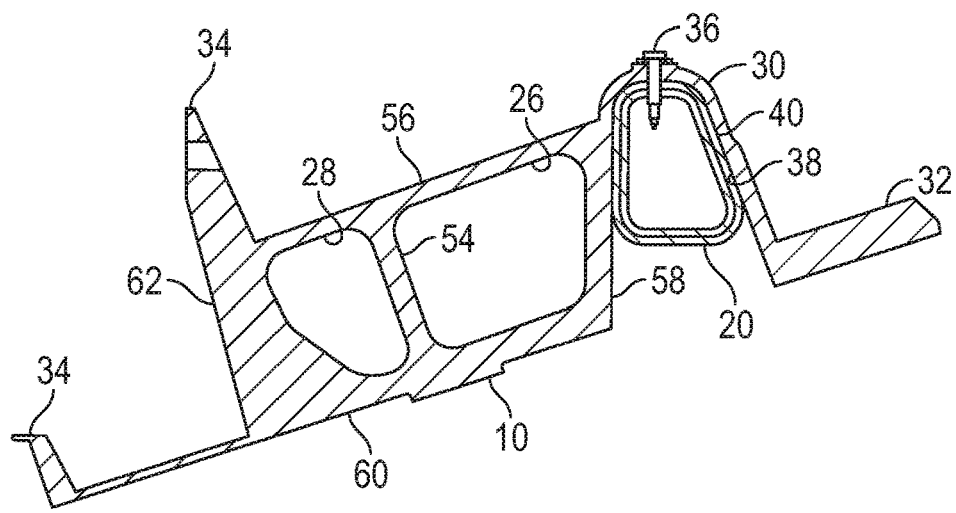
FIG. 2 is a cross-section of a structural duct member according to the principles of the present disclosure.
Figure 3:
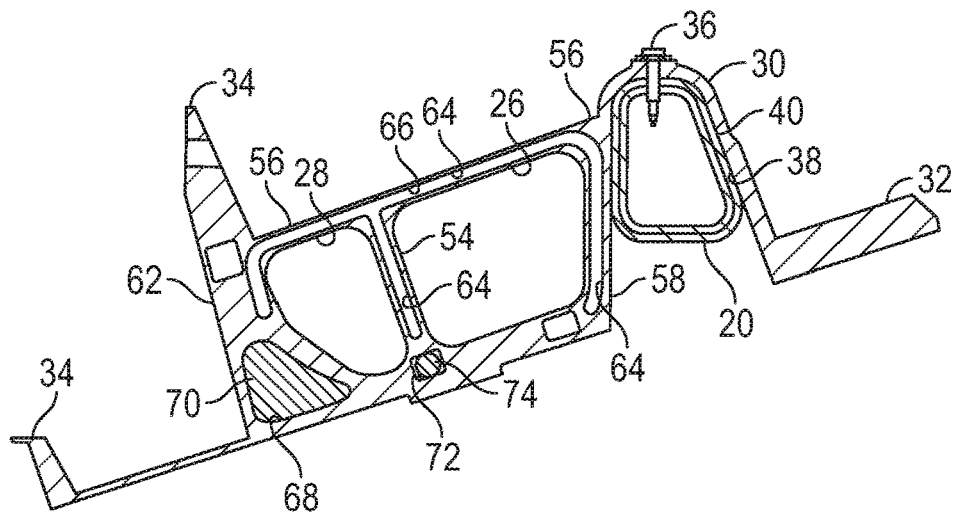
FIG. 3 is a cross-section of a structural duct member according to the principles of the present disclosure.
Figure 4:
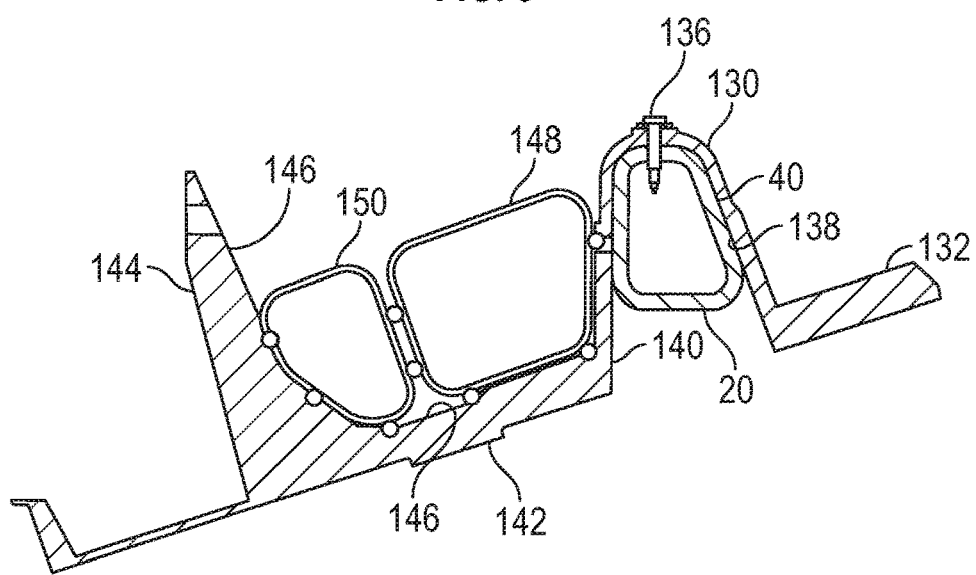
FIG. 4 is a cross-section of a structural duct member according to the principles of the present disclosure.

Referring now to FIGS. 2-4 in addition to FIG. 1, it is illustrated that the structural IP member 10 includes several features that provide an assortment of functions. For example, the structural IP member 10 includes a first HVAC duct 26, a second HVAC duct 28, a cross beam mount 30, a steering column support 32, and a plurality of dash panel mounts 34. More particularly, the cross beam mount 30 secures the structural IP member 10 to the cross beam 20 via a plurality of fasteners 36. The cross beam mount 30 includes a mating surface 38 that mimics or compliments the cross sectional profile of an outer surface 40 of the cross beam 20. In this regard, the interface between the cross beam mount 30 and the cross beam 20 is a fixed interface while using a minimum number of fasteners 36.

The plurality of dash panel mounts 34 combine with fasteners 36 to secure the structural IP member 10 to the dash panel (not shown). Not only does the dash panel mounts 34 help secure the structural IP member 10 in the vehicle, the plurality of dash panel mounts 34 also play a key roll in crash safety which will be explained further below.

The steering column bracket 18 is fixedly suspended from the steering column support 32 of the structural IP member 10. In turn, the steering column bracket 18 supports the steering column assembly 22. Like the plurality of dash panel mounts 34, the steering column bracket 18 and steering column support 32 of the structural IP member 10 have important functions regarding occupant safety during vehicle crashes.

As illustrated most clearly in FIGS. 1 and 2, the first HVAC duct 26 and second HVAC duct 28 of the structural IP member 10 function to direct airflow from the source of the airflow, a HVAC blower or fan (not shown) to a dash panel or floor vent (not shown). Each of the first HVAC duct 26 and second HVAC duct 28 of the structural IP member 10 include a first or intake end 42, 44 and a second or exhaust end 46, 48. In FIG. 2, a center section 50, 52 of each of the first HVAC duct 26 and second HVAC duct 28 of the structural IP member 10 are separated by a first wall 54 while the remaining surfaces of the first HVAC duct 26 and second HVAC duct 28 are formed by a second wall 56, a third wall 58, a fourth wall 60, and a fifth wall 62.

Turning now to FIG. 3 with continued reference to FIGS. 1 and 2, another example of the structural IP member 10 has a plurality of internal cavities included for a number of purposes. For example, a first cavity 64 may be disposed in portions of the second wall 56, the third wall 58, and the fifth wall 62. A sound insulating member 66 may be installed into the first cavity 64 to improve the NVH characteristics of the cabin of the vehicle. A second cavity 68 may be disposed within the fifth wall 62 containing an energy absorbing member 70 that reduces the energy transferred from an impact with another vehicle or object to the occupant or driver of the vehicle and improves the overall crash performance of the vehicle.

A third cavity 72 is disposed in the fourth wall 60 extending from the first end 42 to the second end 46 of the structural IP member 10. Within the third cavity 72, a wire harness 74 may be placed or retained such that the third cavity 72 acts as a conduit to protect the wire harness 74 from contact damage with other components or the driver.

The structural IP member 10 may be manufactured using a number of processes and using a number of materials. For example, the structural IP member 10 may be manufactured using a 3D or additive printing process using a metal alloy such as an aluminum alloy. Alternatively, the structural IP member 10 may be manufactured from a sand or investment casting process that uses additive manufacturing processes to make cores and molds.

Turning now to FIG. 4, another example of the structural IP member 100 is illustrated and will now be described. The structural IP member 100 includes a cross beam mount 130, a steering column support 132, and a plurality of dash panel mounts 134. More particularly, the cross beam mount 130 secures the structural IP member 100 to the cross beam 20 via a plurality of fasteners 136. The cross beam mount 130 includes a mating surface 138 that mimics or compliments the cross sectional profile of an outer surface 40 of the cross beam 20. In this regard, the interface between the cross beam mount 130 and the cross beam 20 is a fixed interface while using a minimum number of fasteners 136.

The structural IP member 100 includes a first wall 140, a second wall 142, and a third wall 144 that combine to form a U-shaped channel 146. A first duct 148 and a second duct 150 are disposed in the U-shaped channel 146 and fixed to the structural IP member 100 using a fastening mechanism such as brazing or welding. However, other types of fastening mechanisms may be used to fix the first duct 148 and second duct 150 to the structural IP member 100 without departing from the scope of the present disclosure.

While examples have been described in detail, those familiar with the art to which this disclosure relates will recognize various alternative designs and examples for practicing the disclosed structure within the scope of the appended claims.

The following is claimed:

1. A structural instrument panel member for an instrument panel assembly of a vehicle, the structural instrument panel member comprising:
    a cross beam mount having a first surface, a first side, and a second side, and wherein the cross beam mount is fastened to a cross beam of the vehicle;
    a steering column support extending from the first side of the cross beam mount;
    a first HVAC duct having a first end and a second end, and wherein the first HVAC duct is disposed adjacent the second side of the cross beam mount;
    a second HVAC duct having a third end and a fourth end, and wherein the second HVAC duct is disposed adjacent the first HVAC duct;
    a first, second, third, fourth and fifth wall, wherein the first wall is adjacent each of the first and second HVAC ducts, the second wall is adjacent the first HVAC duct and the second side of the cross beam mount, the third wall forms a top of each of the first and second HVAC ducts, the fourth wall forms a bottom of each of the first and second HVAC ducts, and the fifth wall is opposite the second wall, wherein at least one of the first, second, third, fourth and fifth walls include an internal cavity; and
    a sound absorbing member disposed in the internal cavity of the at least one of the first, second, third, fourth and fifth walls.

2. The structural instrument panel member of claim 1 further comprising a first dash panel mount extended from the first HVAC duct and fastened to a dash panel of the vehicle.

3. The structural instrument panel member of claim 1 further comprising an energy absorbing member disposed in the internal cavity of the at least one of the first, second, third, fourth and fifth walls.

4. The structural instrument panel member of claim 1 further comprising a channel disposed in at least one of the first, second, third, fourth and fifth walls.

5. The structural instrument panel member of claim 4 further comprising a wire harness disposed in the channel of the at least one of the first, second, third, fourth and fifth walls.

6. A structural instrument panel member for an instrument panel assembly of a vehicle, the structural instrument panel member comprising:
    a cross beam mount having a first surface, a first side, and a second side, and wherein the cross beam mount is fastened to a cross beam of the vehicle;
    a steering column support extending from the first side of the cross beam mount;
    a first and second HVAC duct each having a first end and a second end, and wherein the first HVAC duct is disposed on the second side of the cross beam mount and the second HVAC duct is disposed adjacent the first HVAC duct,
    a first dash panel mount extended from the first HVAC duct and fastened to a dash panel of the vehicle;
    a first, second, third, fourth and fifth wall, and wherein the first wall is adjacent each of the first and second HVAC ducts, the second wall is adjacent the first HVAC duct and the second side of the cross beam mount, the third wall forms a top of each of the first and second HVAC ducts, the fourth wall forms a bottom of each of the first and second HVAC ducts, and the fifth wall is opposite the second wall, and wherein at least one of the first, second, third, fourth and fifth walls include an internal cavity; and
    an energy absorbing member disposed in the internal cavity of the at least one of the first, second, third, fourth and fifth walls.

7. The structural instrument panel member of claim 6 further comprising a sound absorbing member disposed in the internal cavity of the at least one of the first, second, third, fourth and fifth walls.

8. The structural instrument panel member of claim 6 further comprising a channel disposed in at least one of the first, second, third, fourth and fifth walls.

* * * * *